(12) United States Patent
Ishii et al.

(10) Patent No.: US 9,969,420 B2
(45) Date of Patent: May 15, 2018

(54) POSITION ADJUSTING APPARATUS OF STEERING WHEEL

(71) Applicant: NSK LTD., Tokyo (JP)

(72) Inventors: Takayuki Ishii, Maebashi (JP); Seiichi Moriyama, Maebashi (JP); Shin Mihara, Maebashi (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/123,002

(22) PCT Filed: Oct. 22, 2014

(86) PCT No.: PCT/JP2014/078155
§ 371 (c)(1),
(2) Date: Sep. 1, 2016

(87) PCT Pub. No.: WO2015/145845
PCT Pub. Date: Oct. 1, 2015

(65) Prior Publication Data
US 2017/0072986 A1    Mar. 16, 2017

(30) Foreign Application Priority Data

Mar. 26, 2014 (JP) .................................. 2014-063086
May 14, 2014 (JP) .................................. 2014-100834

(51) Int. Cl.
*B62D 1/184* (2006.01)
*B62D 1/189* (2006.01)

(52) U.S. Cl.
CPC ............. *B62D 1/184* (2013.01); *B62D 1/189* (2013.01)

(58) Field of Classification Search
CPC .............................. B62D 1/184; B62D 1/189
See application file for complete search history.

(56) References Cited

U.S. PATENT DOCUMENTS

| 5,117,707 A | * | 6/1992 | Kinoshita | .............. B62D 1/184 |
| | | | | 280/775 |
| 5,527,068 A | | 6/1996 | Schneider | |
| 5,593,183 A | * | 1/1997 | Fouquet | ................. B62D 1/195 |
| | | | | 280/775 |

(Continued)

FOREIGN PATENT DOCUMENTS

| JP | 2001-322552 A | 11/2001 |
| JP | 2002-46626 A | 2/2002 |

(Continued)

OTHER PUBLICATIONS

Supplementary European Search Report dated Feb. 17, 2017 issued by European Patent Office in counterpart European Application No. 14887079.3.

(Continued)

*Primary Examiner* — Drew J Brown
(74) *Attorney, Agent, or Firm* — Sughrue Mion, PLLC

(57) ABSTRACT

At least one of the vehicle body side through holes and the column side through hole is an adjusting long hole which is long in a direction in which a position of the steering wheel can be adjusted. A base end portion of the adjusting lever includes a lever side through hole penetrating through the base end portion in the width direction. The adjusting rod is press-fitted into the lever side through hole.

6 Claims, 16 Drawing Sheets

(56) References Cited

U.S. PATENT DOCUMENTS

| | | | | |
|---|---|---|---|---|
| 5,941,129 | A * | 8/1999 | Anspaugh | B62D 1/184 74/493 |
| 6,082,216 | A * | 7/2000 | Watanabe | F16H 59/0278 74/473.3 |
| 6,467,807 | B2 * | 10/2002 | Ikeda | B62D 1/184 280/775 |
| 7,322,608 | B2 * | 1/2008 | Yamamoto | B62D 1/184 280/775 |
| 7,882,761 | B2 * | 2/2011 | Cymbal | B62D 1/184 280/775 |
| 8,578,812 | B2 * | 11/2013 | Minamigata | B62D 1/184 280/775 |
| 8,590,932 | B2 * | 11/2013 | Dietz | B62D 1/184 280/775 |
| 9,522,693 | B2 * | 12/2016 | Tomaru | B62D 1/184 |
| 2002/0175512 | A1 | 11/2002 | Irish et al. | |
| 2006/0213309 | A1 * | 9/2006 | Zernickel | B62D 1/184 74/493 |
| 2008/0143092 | A1 | 6/2008 | Menjak et al. | |
| 2011/0041642 | A1 * | 2/2011 | Havlicek | B62D 1/184 74/493 |
| 2011/0064538 | A1 * | 3/2011 | Oertle | B62D 1/184 411/360 |
| 2012/0318093 | A1 | 12/2012 | Huber | |

FOREIGN PATENT DOCUMENTS

| | | |
|---|---|---|
| JP | 2002-87286 A | 3/2002 |
| JP | 2004-148996 A | 5/2004 |
| JP | 2005-138825 A | 6/2005 |

OTHER PUBLICATIONS

Search Report dated Jan. 20, 2015, issued by the International Searching Authority in counterpart International Application No. PCT/JP2014/078155 (PCT/ISA/210).

Written Opinion dated Jan. 20, 2015, issued by the International Searching Authority in counterpart International Application No. PCT/JP2014/078155 (PCT/ISA/237).

\* cited by examiner

POSITION ADJUSTING APPARATUS OF STEERING WHEEL

TECHNICAL FIELD

The present invention relates to an improved position adjusting apparatus of a steering wheel which adjusts at least one of a front-rear position and an upper-lower position of a steering wheel according to the physique and driving attitude of a driver.

BACKGROUND ART

A steering apparatus for a vehicle, as shown in FIG. 12, is configured to transmit the rotation of a steering wheel 1 to a input shaft 3 of a steering gear unit 2, push and pull a pair of right and left tie rods 4, 4 with rotation of the input shaft 3, and then cause a front wheel to have a certain steering angle. The steering wheel 1 is supported and fixed to a rear end portion of a steering shaft 5 which is inserted into a cylindrical steering column 6 in the axial direction and is rotatably supported by the steering column 6. A front end portion of the steering shaft 5 is connected through a universal joint 7 to a rear end portion of an intermediate shaft 8 while a front end portion of the intermediate shaft 8 is connected through another universal joint 9 to the input shaft 3.

In this steering apparatus, there has been known a steering apparatus which includes a tilt mechanism for adjusting the upper-lower position of the steering wheel 1 and a telescopic mechanism for adjusting the front-rear position thereof according to the physique and driving attitude of a driver.

In order to constitute the tilt mechanism, the steering column 6 is pivotably supported with respect to a vehicle body 10 around a pivot shaft 11 provided in a width direction (which refers to the width direction of the vehicle body 10 and coincides with the left-right direction: this applies similarly in the specification and the whole of claims). Also, a displacement bracket fixed to the steering column 6 at a portion close to a rear end thereof is supported such that it can be displaced in the upper-lower direction and the front-rear direction (the front-rear direction refers to the front-rear direction of the vehicle body: this applies similarly in the whole of the specification) with respect to a support bracket 12 supported on the vehicle body 10.

Also, in order to constitute the telescopic mechanism allowing the front-rear displacement, the steering column 6 includes an outer column 13 and an inner column 14 combined together in a telescopically expandable and contractible manner, and the steering shaft 5 includes an outer shaft 15 and an inner shaft 16 combined together by spline engagement or the like such that they can transmit torque and can be expanded and contracted.

Here, the illustrated example also incorporates therein an electric power steering apparatus which reduces force necessary to operate the steering wheel 1 with an electric motor 17 as an auxiliary power source.

In the tilt mechanism and telescopic mechanism, except for the electric system, the position of the steering wheel 1 can be adjusted or can be fixed to an adjusted position based on an operation of an adjusting lever. For example, as shown in FIGS. 13 and 14, Patent Document 1 discloses a structure in which, based on the rotation of an adjusting rod 19 by an adjusting lever 18, the axial dimension of a cam device 20 provided on the axial one end portion (the left end portion in FIG. 14) of the adjusting rod 19 is expanded and contracted, and a cam member 21 is pivotably displaced. A cam device for expanding and contracting an axial dimension by an adjusting lever is known, for example, by a disclosure of Patent Document 2. In a first conventional structure example shown in FIGS. 13 and 14, a displacement bracket 22 fixed to an outer column 13a is engaged with and disengaged from a support bracket 12a based on the expansion and contraction of the cam device 20. Also, permission and prohibition of a sliding motion of an inner column 14a to the outer column 13a can be switched according to a pivot displacement of the cam member 21.

A pair of left and right support plate parts 23, 23 constituting the support bracket 12a respectively include, in their mutually corresponding portions, upper-lower long holes 24, 24, which are vehicle body side through holes, whereas the displacement bracket 22 includes front-rear long holes 25, 25, which are column side through holes penetrating therethrough in the width direction. The adjusting rod 19 penetrates through the upper-lower long holes 24, 24 of the two support plate parts 23, 23 and the front-rear long holes 25, 25 of the displacement bracket 22 in the width direction. To adjust the upper-lower position or the front-rear position of the steering wheel 1 (see FIG. 12) supported and fixed to the rear end portion of the steering shaft 5a constituted of the outer shaft 15a and the inner shaft 16a, the adjusting lever 18 is turned in a specific direction (generally, downward) to reduce the axial dimension of the cam device 20 and separate the cam member 21 from the outer peripheral surface of the inner column 14a. The cam device 20 includes a drive cam 26 supported and fixed to an axial one end portion of the adjusting rod 19, which is capable of displacing along the upper-lower long holes 24, 24 and rotating around a center axis thereof, such that the drive cam 26 is prevented from (incapable of) relative rotation and axial displacement with respect to the adjusting rod 19, and a driven cam 27 supported to the adjusting rod 19 at a portion close to the axial one end portion to be capable of relative rotation and axial displacement to the adjusting rod 19.

To adjust the upper-lower position or the front-rear position of the steering wheel 1, by turning the adjusting lever 18 in a specific direction (generally, downward), as shown in FIG. 15A, a projecting portion 28 provided on the inside surface (right side surface in FIG. 14; lower side surface in FIG. 15) of the drive cam 26 and a recessed portion 29 formed in the outside surface (left side surface in FIG. 14; upper side surface in FIG. 15) of the driven cam 27 are engaged with each other to reduce the axial dimension of the cam device 20. In this state, within the range where the adjusting rod 19 can be displaced in the two upper-lower long holes 24, 24 and the two front-rear long holes 25, 25, the outer column 13a is displaced. The position of the steering wheel 1 supported and fixed to the rear end portion of the steering shaft 5a rotatably supported within the outer column 13a is adjusted. After the steering wheel 1 is moved to the desired position, by turning the adjusting lever 18 in a direction reverse to the specific direction, as shown in FIG. 15B, the projecting portion 28 of the drive cam 26 is engaged with a step portion 30 formed in the outside surface of the driven cam 27 to expand the axial dimension of the cam device 20. This reduces a clearance between the driven cam 27 and a nut 32 threadedly fixed to a male screw portion 31 formed in an axial other end portion (the right end portion in FIG. 14) of the adjusting rod 19, whereby the two support plate parts 23, 23 press firmly an outer peripheral surface of the outer column 13a through the displacement bracket 22. At the same time, the cam member 21 presses the outer peripheral surface of the inner column 14a toward the inner peripheral surface of the outer column 13a. As a result, the steering wheel 1 can be held at the adjusted position.

In the above position adjusting apparatus of the steering wheel, by press-fitting an engagement projecting portion 33 formed on the outside surface of the drive cam 26 into an engagement hole 34 formed in the base end portion of the adjusting lever 18, the drive cam 26 and adjusting lever 18 are connected to each other without rattling. Further, the axial one end of the adjusting rod 19 made of a hard metal such as high-carbon steel and bearing steel is press-fitted into a center hole 35 of the drive cam 26. Due to this structure, the drive cam 26 is supported on the axial one end of the adjusting rod 19 such that relative rotation and axial displacement to the adjusting rod 19 are prevented, and the adjusting lever 18 is supported on the adjusting rod 19 without rattling.

The drive cam 26 constituting the above cam device 20 can be made of a sintered metal in order to prevent occurrence of abnormal abrasion or galling between the drive cam 26 and the driven cam 27. When the drive cam 26 is made of a sintered metal, an engagement portion between the center hole 35 of the drive cam 26 and adjusting rod 19 requires high shape precision and dimension precision. This can result in an increased manufacturing cost of the drive cam 26 and the adjusting rod 19, and thus the whole of the position adjusting apparatus of the steering wheel.

On the other hand, FIG. 16 shows a second conventional structure example of a position adjusting apparatus of a steering wheel. In the second conventional structure example, a sleeve 36 made of a light alloy such as an aluminum based alloy or made of a synthetic resin such as polyamide resin is engaged into the center hole 35a of a drive cam 26a constituting the cam device 20 (see FIG. 14), and the adjusting rod 19 is fitted (loose fitted) into an inside diameter side of the sleeve 36. Thus, the drive cam 26a is supported on the axial one end of the adjusting rod 19 such that it is capable of relative rotation and axial displacement to the adjusting rod 19. Also, in the second conventional structure example, a driven cam (not shown) is supported on the axial other end of the adjusting rod 19 such that it is capable of axial displacement but is prevented from relative rotation to the adjusting rod 19.

In the second conventional structure example, an engagement portion between the drive cam 26a and the sleeve 36 does not require especially high shape and dimension precision. Thus, even if the drive cam 26a is made of a sintered metal, a manufacturing cost of the position adjusting apparatus of the steering wheel does not increase excessively. However, in the second conventional structure example, there is a possibility that following problems can arise. That is, an annular clearance exists between an inner peripheral surface of the sleeve 36 and an outer peripheral surface of the adjusting rod 19. Thus, while the axial dimension of the cam device 20 (see FIG. 14) is expanded, the drive cam 26a is firmly held between the driven cam and the nut 37 (see FIG. 14) threadedly fixed to the axial one end of the adjusting rod 19, thereby preventing rattling of the driven cam 26a to the adjusting rod 19. However, while the adjusting lever 18 is turned in a specific direction to reduce the axial dimension of the cam device 20, the drive cam 26a can rattle with respect to the adjusting rod 19 (in a diameter direction and an axial direction).

PRIOR ART DOCUMENT

Patent Document

Patent Document 1: JP-A-2001-322552
Patent Document 2: JP-A-2002-87286

SUMMARY OF THE INVENTION

Problem to be Solved

The present invention has been made in consideration of the above-described circumstance, and provides a position adjusting apparatus of a steering wheel which can prevent an adjusting lever from rattling with respect to an adjusting rod and can prevent an increase in a manufacturing cost of the apparatus even when a drive cam constituting a cam device is made of a hard material.

Means for Solving the Problem

A position adjusting apparatus of a steering wheel of the present invention comprises:

a cylindrical steering column which rotatably supports therein a steering shaft, a rear end portion of which a steering wheel is supported and fixed to;

a displacement bracket which is fixed to a portion (for example, upper or lower portion of an axial intermediate portion) of the steering column;

a support bracket which is supported on a vehicle body and includes left and right support plate portions which interpose the displacement bracket from both sides in a width direction;

an adjusting rod which is inserted in the width direction through vehicle body side through holes formed in the support plate portions and a column side through hole formed in the displacement bracket; and a cam device which includes a drive cam externally engaged with and supported on an axial one end of the adjusting rod such that an axial displacement is prevented, and a driven cam engaged into the vehicle body side through hole formed in one of the two support plate portions and externally engaged with and supported on a portion of the adjusting rod close to an axial end thereof such that an axial displacement is permitted, wherein the drive cam is rotatable based on an operation of an adjusting lever connected to the drive cam, and the cam device is configured to extend and contract an axial dimension of the cam device according to a rotation of the drive cam with respect to the driven cam, thereby extending and contracting a distance between the two support plate portions.

At least one of the vehicle body side through holes and the column side through hole is an adjusting long hole which is long in a direction in which a position of the steering wheel can be adjusted.

In case of the position adjusting apparatus of the steering wheel of the present invention, a base end portion of the adjusting lever includes a lever side through hole penetrating through the base end portion in the width direction, and the adjusting rod is press-fitted into the lever side through hole.

In case of employing the above-described position adjusting apparatus of the steering wheel, the adjusting rod is preferably inserted into a center hole of the drive cam with no fastening margin.

In case of employing the present invention, for example, the drive cam is made of a sintered metal or a ceramic.

In case of employing the present invention, the base end portion of the adjusting lever is preferably made of a material (for example, a steel, a light alloy such as an aluminum alloy or a synthetic resin) softer than a material (for example, a metallic material such as high carbon steel or bearing steel) which constitutes the adjusting rod.

In case of employing the present invention, for example, the adjusting lever includes a lever side engagement portion provided in an inside surface of the base end portion in the width direction, and the drive cam includes a cam side engagement portion provided in an outside surface of the drive cam in the width direction. The lever side engagement portion and the cam side engagement portion are engaged with each other with a fastening margin to be non-rotatable with each other.

In this case, for example, the base end portion of the adjusting lever is formed integrally in entirety, and the lever side through hole and the lever side engagement portion are directly formed in the base end portion.

Alternatively, the base end portion of the adjusting lever is configured by combining together multiple parts. The lever side through hole and the lever side engagement portion are formed in mutually different ones of the multiple parts.

In the above case, the drive cam is preferably made of a material (for example, a ceramic, a sintered metal, steel, a light alloy such as an aluminum ally or a synthetic resin) softer than a material (for example, a metallic material such as a sintered metal or steel or a ceramic material) for example, a soft steel, a light alloy such as an aluminum alloy or a synthetic resin) which constitutes the adjusting rod.

Effects of the Invention

According to the above-configured position adjusting apparatus of the steering wheel of the present invention, while preventing an increase in its manufacturing cost, there can be realized a structure which can prevent the adjusting lever from rattling with respect to the adjusting rod even when the drive cam constituting the cam device is made of, for example, a sintered metal or a ceramic.

That is, in the present invention, since the adjusting rod is press-fitted into the lever side through hole of the base end portion of the adjusting lever, the adjusting rod can be prevented from rattling with respect to the adjusting rod even in a state where the adjusting lever is turned in a predetermined direction to thereby reduce the axial dimension of the cam device.

Also, in the present invention, differently from the first conventional structure example previously shown in FIGS. 13 and 14, since such rattling prevention does not require to press-fit the adjusting rod into the center hole of the drive cam, the shape and dimension precision of the engagement portion between the drive cam and adjusting rod need not be enhanced excessively. This can prevent an excessive increase in the manufacturing cost of the whole position adjusting apparatus of the steering wheel.

Also, when the drive cam is made of a ceramic, weight can be reduced.

Further, when the base end portion of the adjusting lever is made of a material softer than a material constituting the adjusting rod (or the drive cam), the amount of deformation on the adjusting lever side can be increased in the engagement portion between the adjusting lever and adjusting rod (or in the engagement portion between the adjusting lever and drive cam). This can prevent rattling of the engagement portion without excessively enhancing the shape and dimension precision thereof. Consequently, an increase in the manufacturing cost of the whole position adjusting apparatus of the steering wheel can be prevented.

DETAILED DESCRIPTION OF EMBODIMENTS

[First Embodiment]

Figure 13:
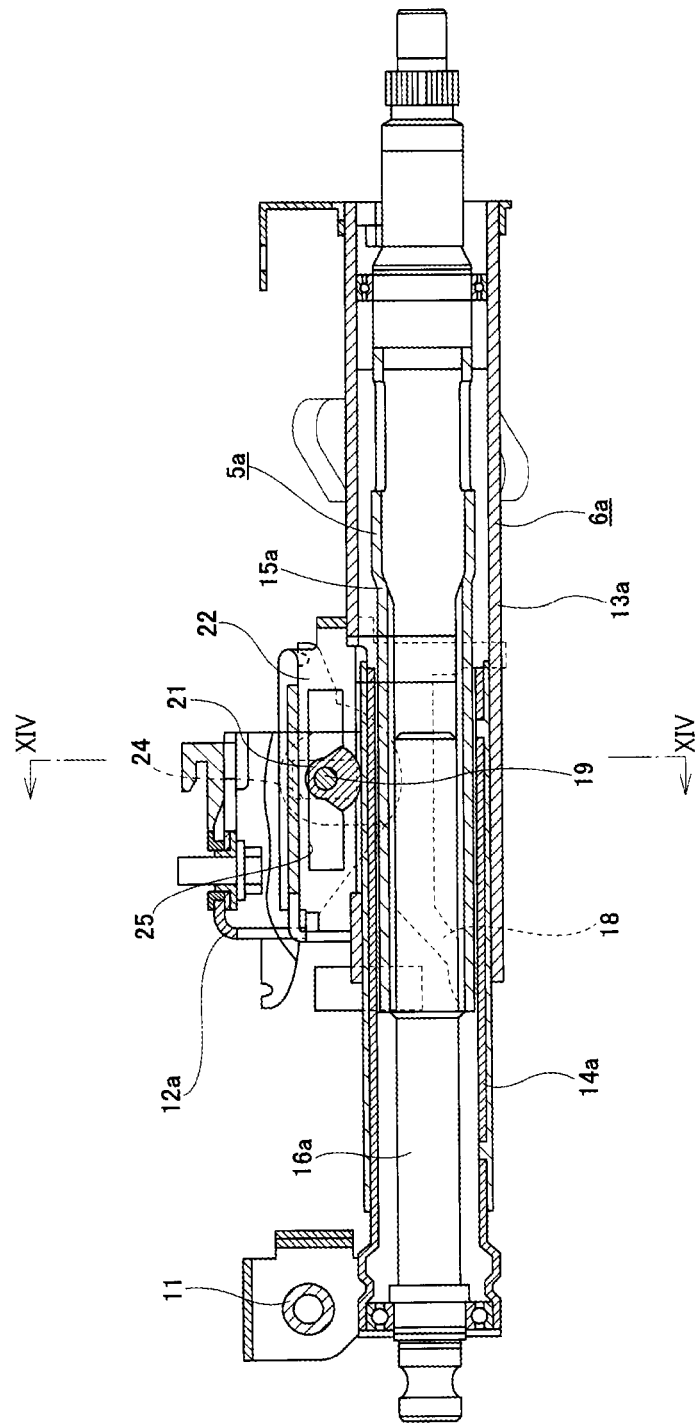
FIG. 13 is a longitudinal section view of a first conventional structure example.

A first embodiment of the present invention will be described in detail with reference to FIGS. 1 to 5. Here, features of a position adjusting apparatus of a steering wheel of the present invention, including this embodiment, is that, even when a drive cam 26b constituting a cam device 20a is made of a sintered metal or a ceramic, rattling of an adjusting lever 18a with respect to an adjusting rod 19a can be prevented while preventing an increase in the manufacturing cost. Since the structures and operations of the remaining portions thereof are similar to a conventionally known steering column apparatus including the above-mentioned structures of FIGS. 13 and 14, the illustration and description of equivalent portions are omitted or simplified. Thus, a following description is given mainly of features of this embodiment.

In this embodiment, the drive cam 26b constituting the cam device 20a is made of an iron-based sintered metal or a ceramic. A adjusting rod 19a is made of a metal such as high carbon steel or bearing steel. At least a base end portion of an adjusting lever 18a is produced by enforcing plastic working on a metal plate such as a steel plate made of a material softer than the metal materials of the drive cam 26b and adjusting rod 19a.

Here, the ceramic material of the drive cam 26b can include alumina, zirconia, silicon nitride, silicon carbide and the like. From a viewpoint of cost, alumina is preferred. As the manufacturing method, sintering, polishing after sintering and the like can be combined with each other properly.

The base end portion of the adjusting lever 18a is connected to the drive cam 26b such that its relative rotation is prevented. For this purpose, specifically, an engagement projecting portion 33a which is formed in the outside surface (left side surface in FIGS. 1 and 2) of the drive cam 26b and serves as a cam side engagement portion is press-fitted into an engagement recessed portion 38 which is formed in an inside surface (right side surface in FIGS. 1 and 2) of a base end portion of the adjusting lever 18a and serves as a lever side engagement portion. Thus, the engagement projecting portion 33a and the engagement recessed portion 38 are non-circular engaged (engaged in a non-rotatable manner) without rattling. In this embodiment, the engagement recessed portion 38 is formed by embossing the base end portion of the adjusting lever 18a.

Figure 1:
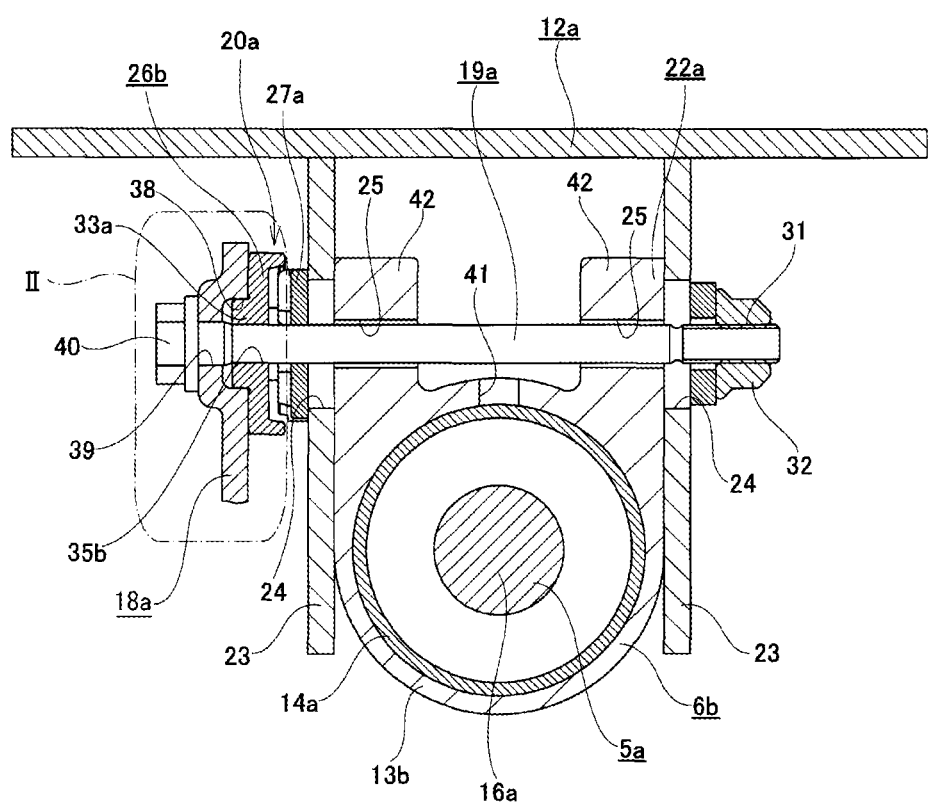
FIG. 1 is a section view of a first embodiment of the present invention.
Figure 2:
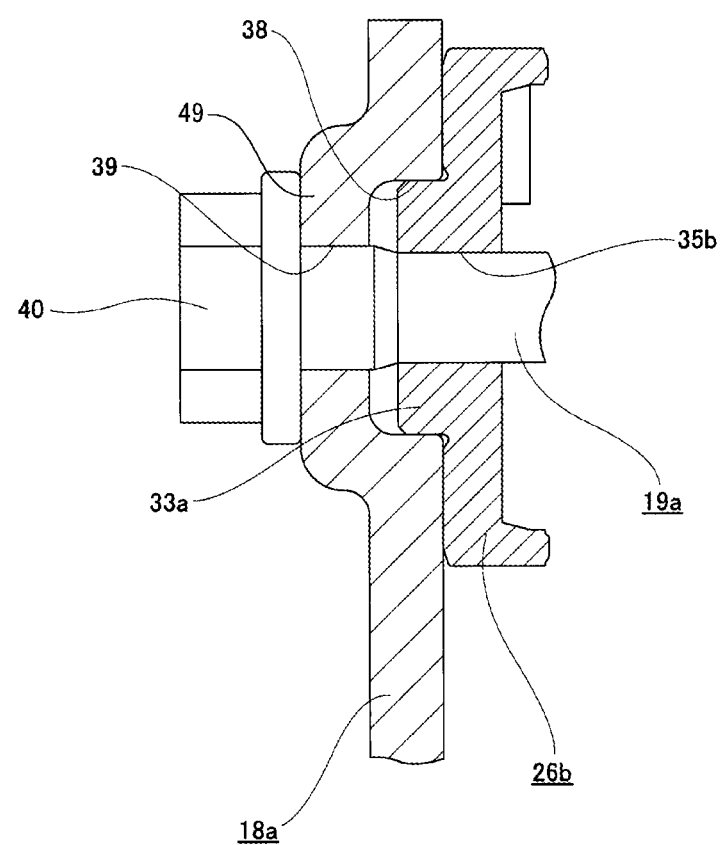
FIG. 2 is an enlarged view of an "II" portion of FIG. 1.
Figure 3A:
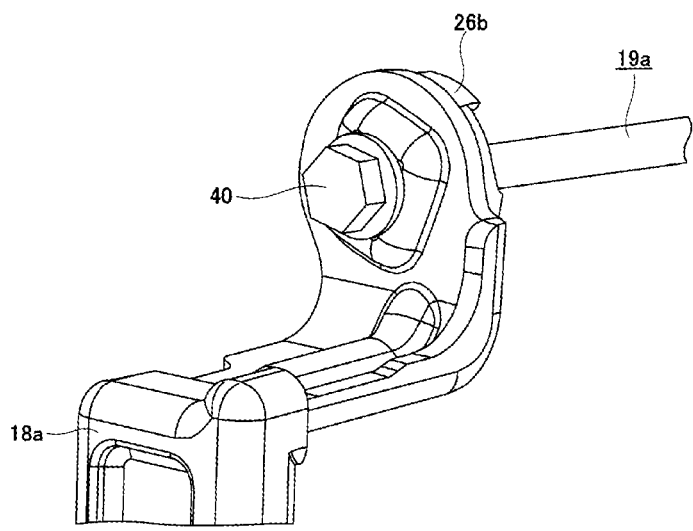
FIG. 3A is a perspective view of an adjusting lever, an adjusting rod and a drive cam which are taken out.
Figure 3B:
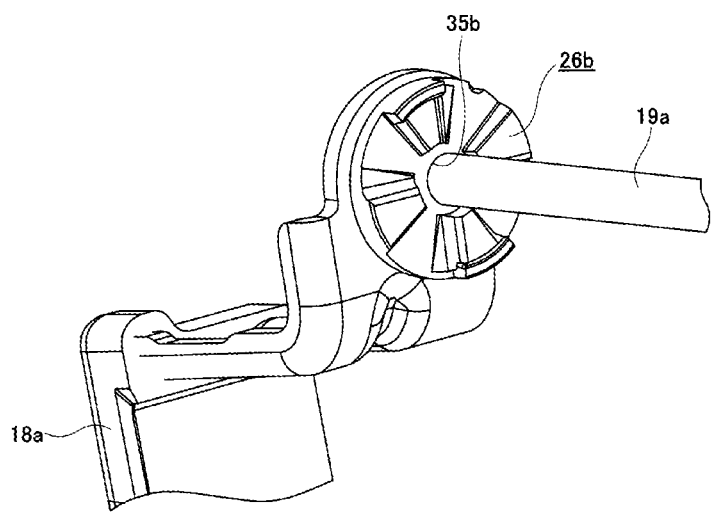
FIG. 3B is a perspective view when viewed from the opposite side of FIG. 3A with respect to the axial direction of the adjusting rod.
Figure 4A:
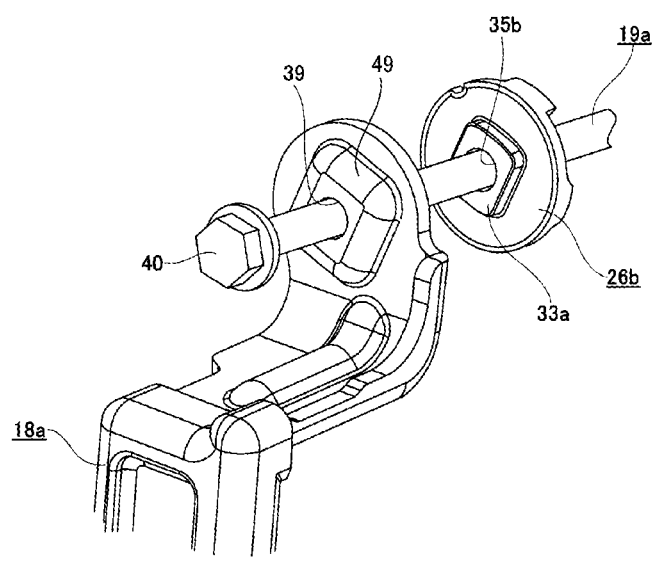
FIG. 4A is an exploded perspective view of the adjusting lever, the adjusting rod and the drive cam.
Figure 4B:
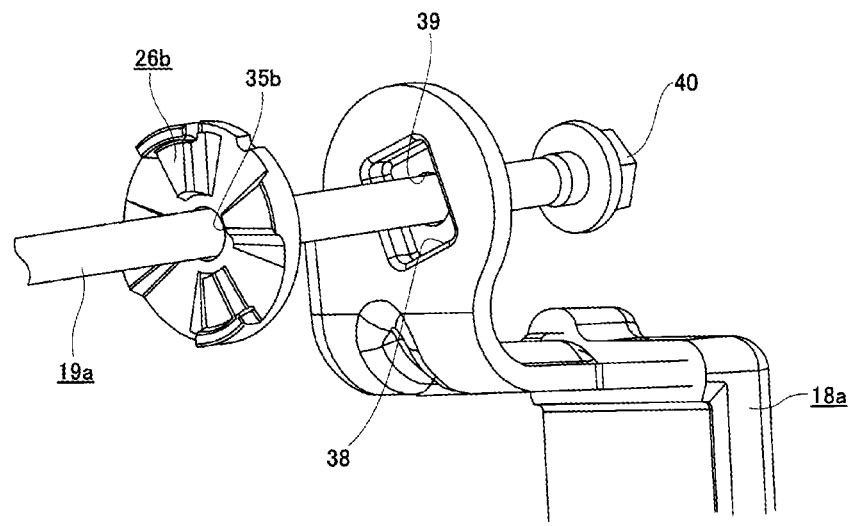
FIG. 4B is an exploded perspective view when viewed from the opposite side of FIG. 4A with respect to the axial direction of the adjusting rod.
Figure 5A:
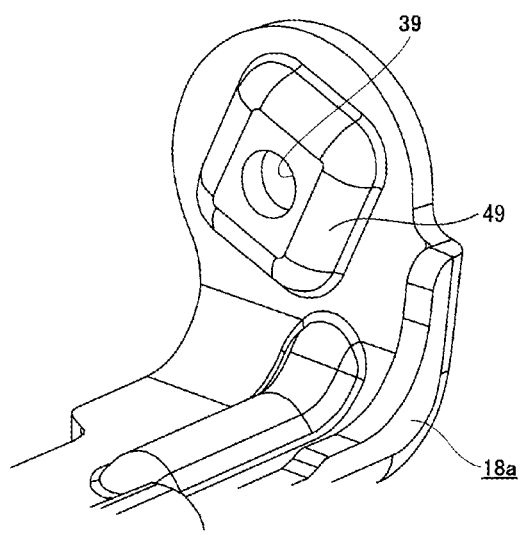
FIG. 5A is a perspective view of the base end portion of the adjusting lever.
Figure 5B:
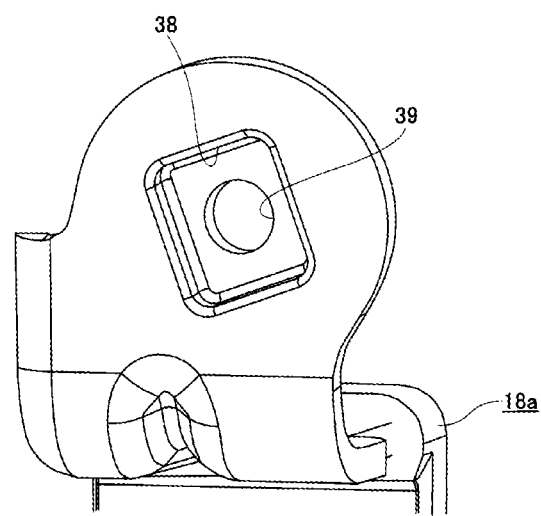
FIG. 5B is a perspective view when viewed from behind FIG. 5A.
Figure 6A:
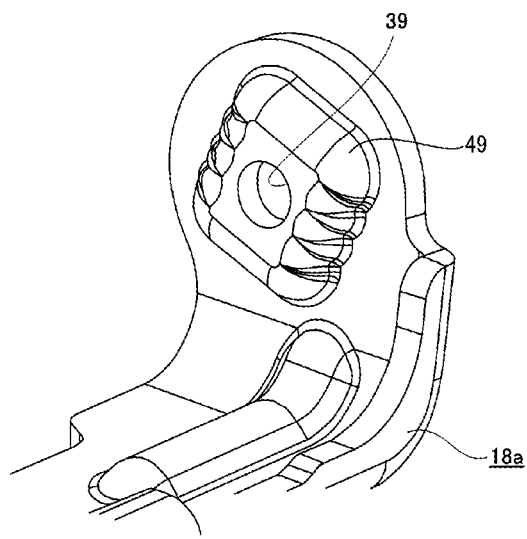
FIGS. 6A and 6B are views similar to FIGS. 5A and 5B, showing a first modification of the first embodiment of the present invention.
Figure 6B:
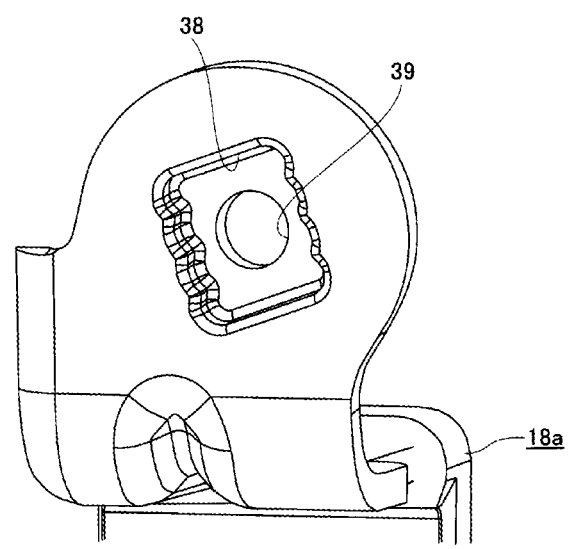

Shapes of the engagement projecting portion 33a and the engagement recessed portion 38 when viewed from the axial direction of the adjusting rod 19 are substantially square. However, the shape is not limited to a square but it can be other polygonal shapes, oval shape or different modified shapes. As shown in FIG. 6, the shape of at least one side (two mutually opposed sides in an illustrated example) of an inner peripheral surface of the engagement recessed portion 38 can be formed uneven with respect to the front-rear direction of this side, and multiple projecting portions constituting this side can be elastically contacted with an outer peripheral surface of the engagement projecting portion 33a. Employment of this structure can increase an elasticity of this side, thereby enabling easy and stable securing of the elastic hold force of the engagement projecting portion 33a to the engagement recessed portion 38.

In the base end portion of the adjusting lever 18a, a portion matching a center hole 35b of the drive cam 26b is formed with a lever side through hole 39 penetrating through the portion in the width direction. The axial one end portion (left end portion in FIG. 1) of the adjusting rod 19a is press-fitted into the lever side through hole 39 and an inside surface of a head 40 fixed to an axial one end edge of the adjusting rod 19a is contacted with the outside surface of the base end portion of the adjusting lever 18a. Thus, the base end portion of the adjusting lever 18a is supported on the axial one end portion of the adjusting rod 19a such that its relative rotation and axial displacement with respect to the adjusting rod 19a is prevented.

A portion of the adjusting rod 19a close to one end thereof is inserted into the center hole 35b of the drive cam 26b with no fastening margin.

Here, the lever side through hole 39 of the base end portion of the adjusting lever 18a is formed in a projecting portion 49 which projects in the width direction outwardly of the engagement recessed portion 38 forming area and with which the inside surface of the head 40 is contacted. That is, the engagement recessed portion 38 and the lever side through hole 39 are formed directly in the base end portion with being offset in the axial direction.

Figure 7A:
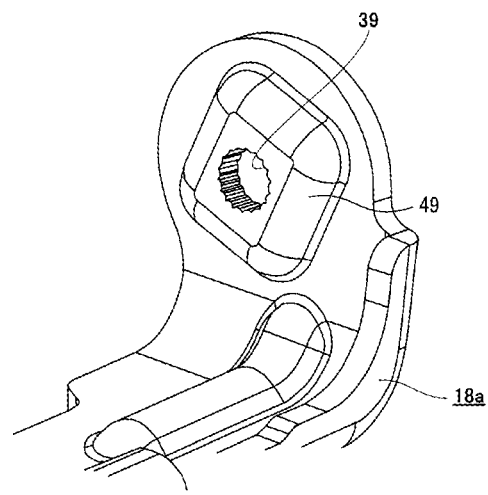
FIGS. 7A and 7B are views similar to FIGS. 5A and 5B, showing a second modification of the first embodiment of the present invention.
Figure 7B:
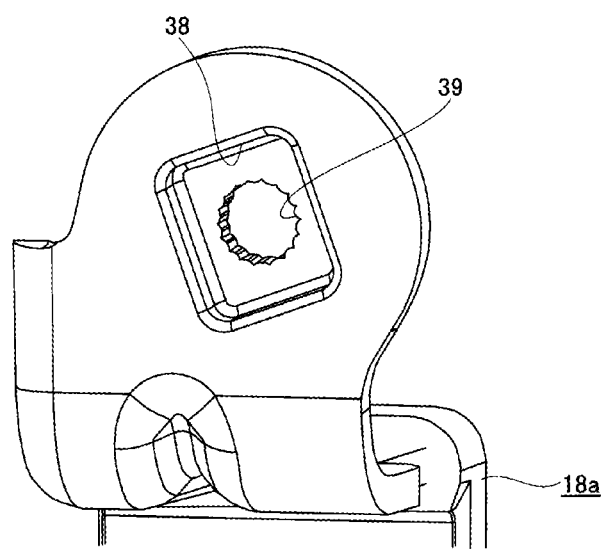

An engagement structure between the lever side through hole 39 of the adjusting lever 18a and the axial one end portion of the adjusting rod 19a employs the press-fitting engagement structure between cylindrical surfaces. However, this engagement structure is not limited to the press-fitting engagement structure between the cylindrical surfaces, but it may also be, for example, a press-fitting engagement structure between polygonal-shaped or different-shaped cylindrical surfaces, a press-fitting engagement structure as shown in FIG. 7 between a serration hole (lever side through hole 39) and a serration shaft portion (the axial one end portion of the adjusting rod 19a), and a press-fitting engagement structure between a hole or a serration hole (lever side through hole 39) having a polygonal-shaped or different-shaped inner surface and a shaft portion (the axial one end portion of the adjusting rod 19a) having a cylindrical outer peripheral surface.

In this embodiment, to enable elastic enlargement and reduction of an inside diameter at a front end portion of an outer column 13b constituting a steering column 6b, an upper portion of the outer column 13b is formed with an axial slit 41 which is long in the axial direction in a front end portion or a near middle portion thereof. An outer peripheral surface of the outer column 13b is provided with a pair of held portions 42, 42 constituting a displacement bracket 22a at a position of interposing the axial slit 41 from both sides.

In this embodiment, to adjust the position of the steering wheel 1 (see FIG. 9), by pivoting (turning) the adjusting lever 18a in a specific direction, an axial dimension of the cam device 20a is contracted to thereby increase a distance between a driven cam 27a constituting the cam device 20a and a nut 32 threadedly fixed to an axial other end of the adjusting rod 19a. In this state, a surface pressure of the contact portion between the inside surfaces of a pair of support plate portions 23, 23 constituting a support bracket 12a and the outside surfaces of the two held portions 42, 42 is reduced or lost. At the same time, the inside diameter of the front end portion of the outer column 13b is elastically enlarged, and the surface pressure of a contact portion between a front end portion inner peripheral surface of the outer column 13b and a rear end portion outer peripheral surface of an inner column 13a is reduced or lost. In this state, within the range enabling displacement of the adjusting rod 19a inside upper-lower long holes 24, 24 formed in the two support plate portions 23, 23 and front-rear long holes 25, 25 formed in the two held plate portions 42, 42, the front-rear position and the upper-lower position of the steering wheel 1 can be adjusted.

With the steering wheel 1 moved to a desired position, the adjusting lever 18a is turned in a direction reverse to the specific direction to extend the axial dimension of the cam device 20a to thereby reduce the distance between inside surfaces of the driven cam 27a and the nut 32. Consequently, the two support plate portions 23, 23 press strongly the held plate portions 42, 42 to thereby prevent the steering column 6b from upper-lower displacement. At the same time, the inside diameter of the front end portion of the outer column 13b is reduced to increase an engagement strength between the front end portion of the outer column 13b and the rear end portion of the inner column 14a, thereby preventing the front-rear displacement of the outer column 13b to the inner column 14a. Consequently, the steering wheel 1 can be held at the adjusted upper-lower and front-rear position. However, the structure of the portion for holding the front-rear position of the steering wheel 1 (the front-rear position of the outer column 13b to the inner column 14a) can also be replaced, like the first conventional structure example previously shown in FIGS. 13 and 14, with the structure for strongly press the outer peripheral surface of the inner column 14a using the cam member 21.

According to the above-mentioned position adjusting apparatus of the steering wheel of the embodiment, there can be realized a structure which can prevent the adjusting lever 18a from rattling with respect to the adjusting rod 19a even when the drive cam 26b is made of a sintered metal or a ceramic while preventing an increase in the manufacturing cost.

That is, in this embodiment, since the axial one end of the adjusting rod 19a is press-fitted into the lever side through hole 39 of the base end portion of the adjusting lever 18a, even in a state where the adjusting lever 18a is turned in a predetermined direction to thereby reduce the axial dimension of the cam device 20a, the adjusting lever 18a can be prevented from rattling with respect to the adjusting rod 19a.

Figure 14:
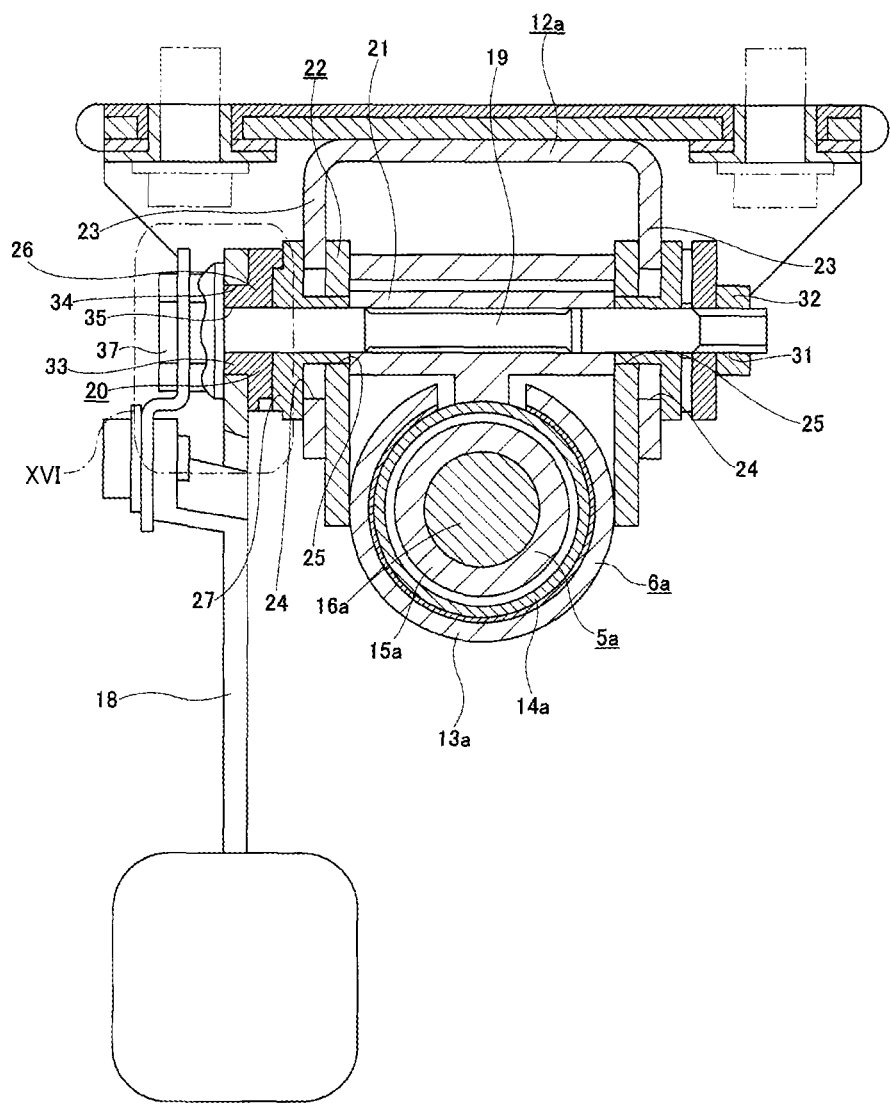
FIG. 14 is an enlarged XIV-XIV section view of FIG. 13.
Figure 15A:
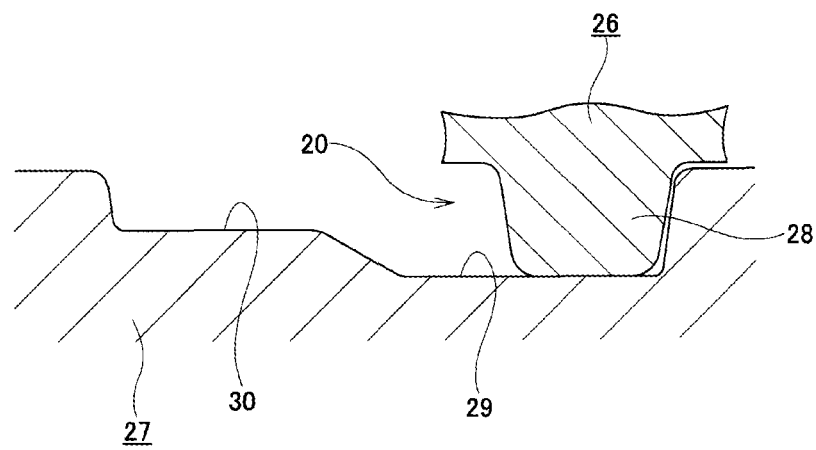
FIGS. 15A and 15B are schematic views of the cam device, explaining its operation.
Figure 15B:
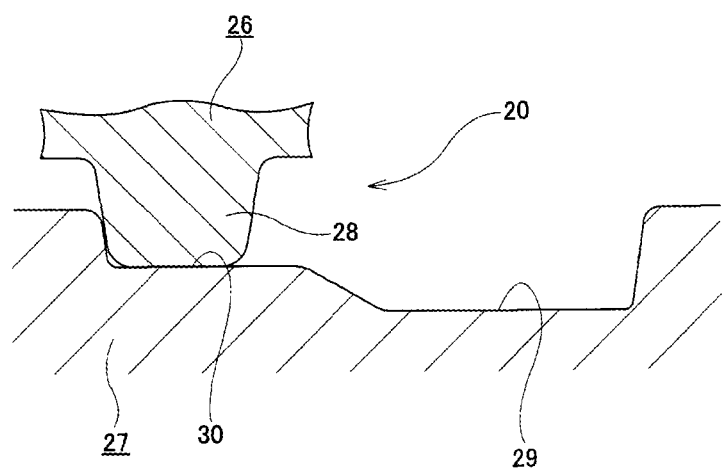
Figure 16:
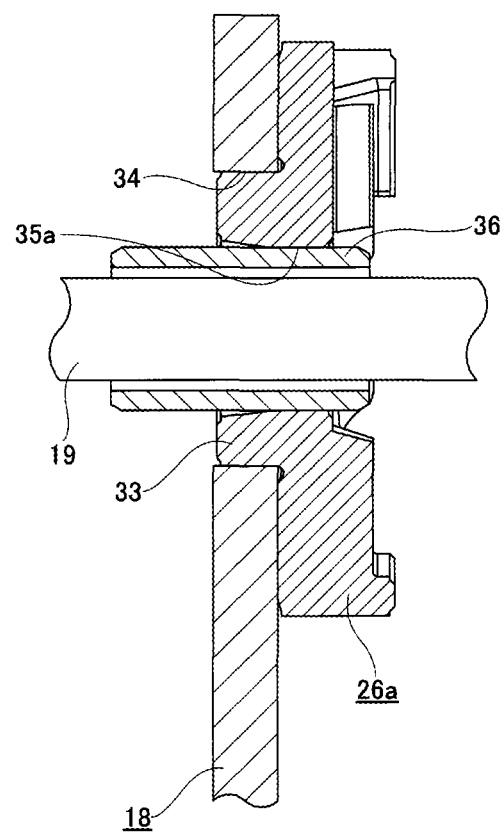
FIG. 16 is a view of a second conventional structure example, corresponding to a "XVI" portion enlarged view of FIG. 14.

Also, in this embodiment, since such rattling prevention does not require press-fitting engagement of the adjusting rod 19a into the center hole 35b of the drive cam 26b as in the first conventional structure example shown in FIGS. 14 and 15, the shape precision and the dimension precision of the engagement portion between the drive cam 26b and adjusting rod 19a do not need be enhanced excessively. This can prevent an excessive increase in the manufacturing cost of the whole of the position adjusting apparatus of the steering wheel.

Especially, in case that the drive cam 26b is made of a ceramic, the cost preventive effect is large.

Especially, in this embodiment, the base end portion of the adjusting lever 18a is made of a material softer than those of the adjusting rod 19a and drive cam 26b. Thus, in the engagement portion between the lever side through hole 39 of the adjusting lever 18a and the axial one end of the adjusting rod 19a, and in the engagement portion between the engagement recessed portion 38 of the adjusting lever 18a and the engagement projecting portion 33a of the drive cam 26b, the amount of displacement on the adjusting lever 18a side can be increased. Therefore, without enhancing the shape precision and dimension precision of the two engagement portions excessively, the two engagement portions can be prevented from rattling.

Similarly, when the drive cam 26b is made of a ceramic, the cost preventive effect is large.

[Second Embodiment]

Figure 8:
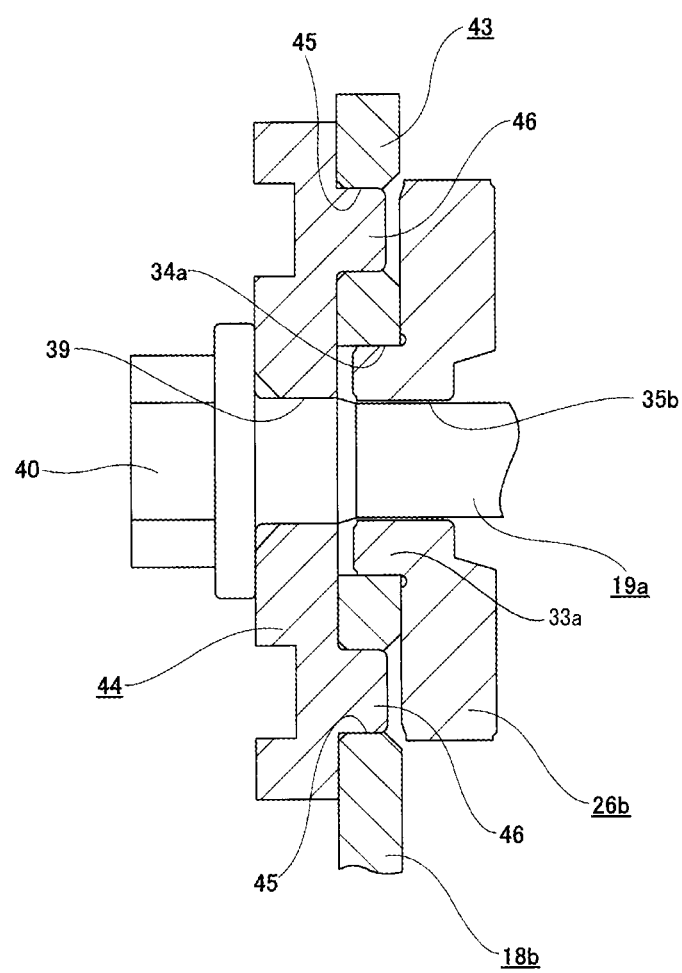
FIG. 8 is a view similar to FIG. 2, showing a second embodiment of the present invention.
Figure 9A:
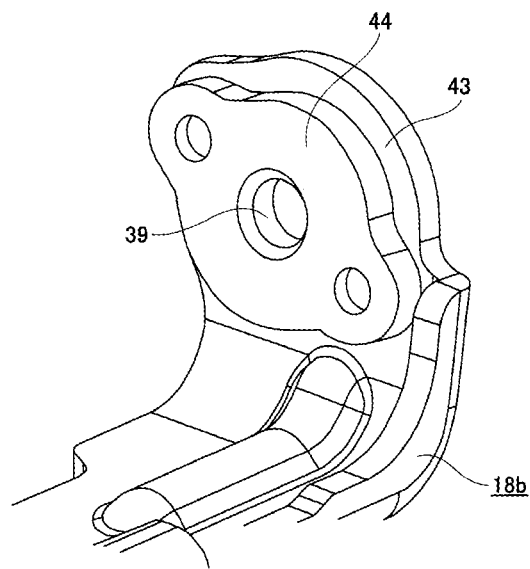
FIGS. 9A and 9B are views similar to FIGS. 5A and 5B, showing the second embodiment of the present invention.
Figure 9B:
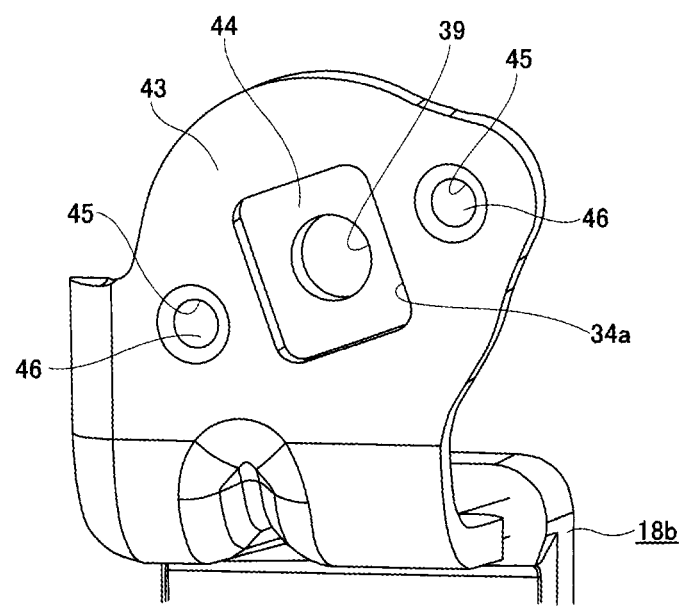

A second embodiment of the present invention will be described with reference to FIGS. 8 and 9. In this embodiment, the base end portion of an adjusting lever 18b includes a base end portion main body 43 made of a metal plate formed integrally with the middle portion of the adjusting lever 18b and a base end portion sub-body 44 made of a metal plate connected and fixed to an outside surface of the base end main body 43. The base end portion main body 43 includes an engagement hole 34a serving as a lever engagement portion at a center portion thereof while the base end portion sub-body 44 includes a lever side through hole 39 at a center portion thereof. An engagement projecting portion 33a formed in the outside surface of a drive cam 26b is press-fitted into the engagement hole 34a. Thus, the engagement hole 34a and the engagement projecting portion 33a are non-circular engaged with each other without rattling. In this embodiment as well, the axial one end of the adjusting rod 19a is press-fitted into the lever side through hole 39, and the portion of the adjusting rod 19a close to one end thereof is inserted into the center hole 35b of the drive cam 26b with no fastening margin.

In this embodiment, as a method for connecting the base end portion sub-body 44 to the outside surface of the base end main body 43, there is adopted a method in which a pair of projecting portions 46, 46 formed in the inside surface of the base end portion sub-body 44 at positions matching a pair of through holes 45, 45 are respectively press-fitted into the pair of through holes 45, 45 formed on the base end portion main body 43 at diametrically opposite positions.

Figure 10:
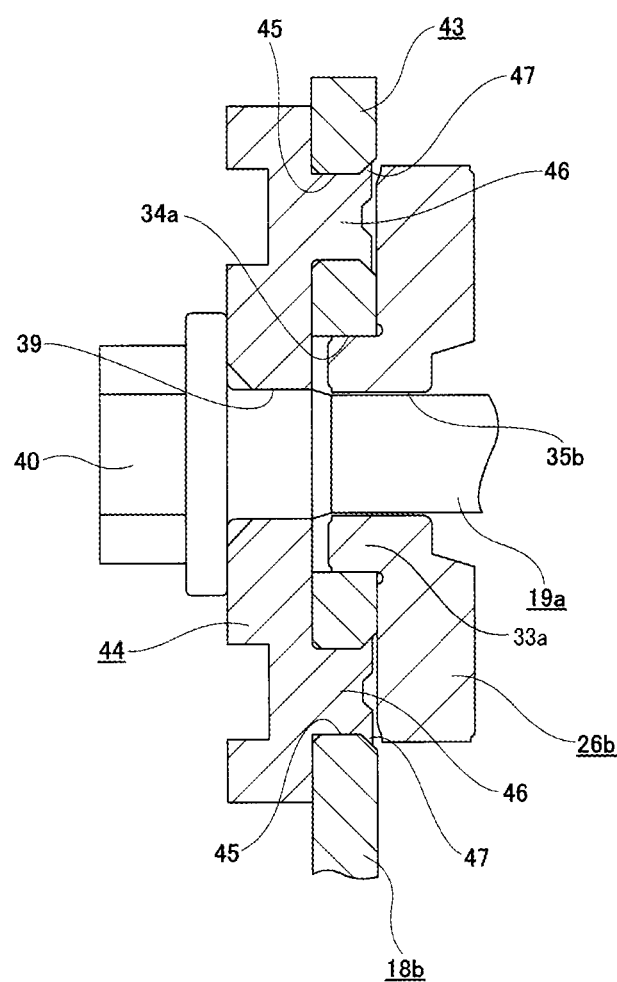
FIG. 10 is a view similar to FIG. 8, showing a modification of the second embodiment of the present invention.
Figure 11:
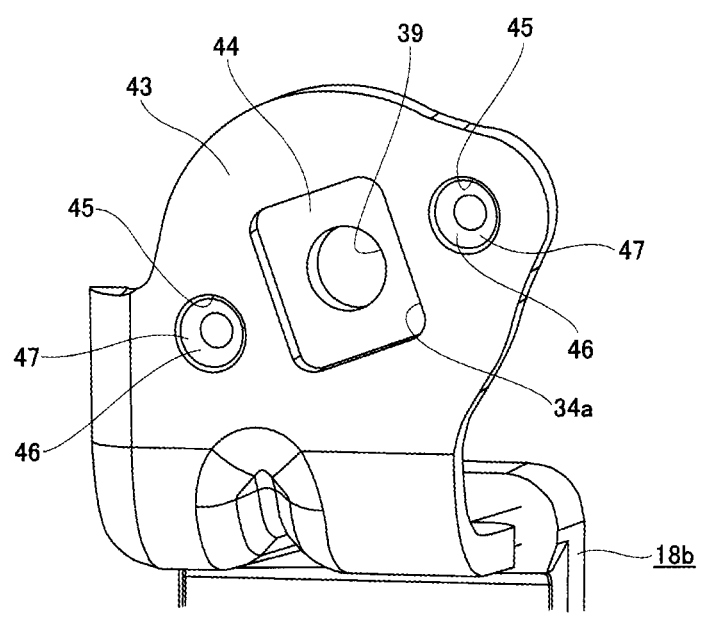
FIG. 11 is a view similar to FIG. 9B, showing the modification of the second embodiment.
Figure 12:
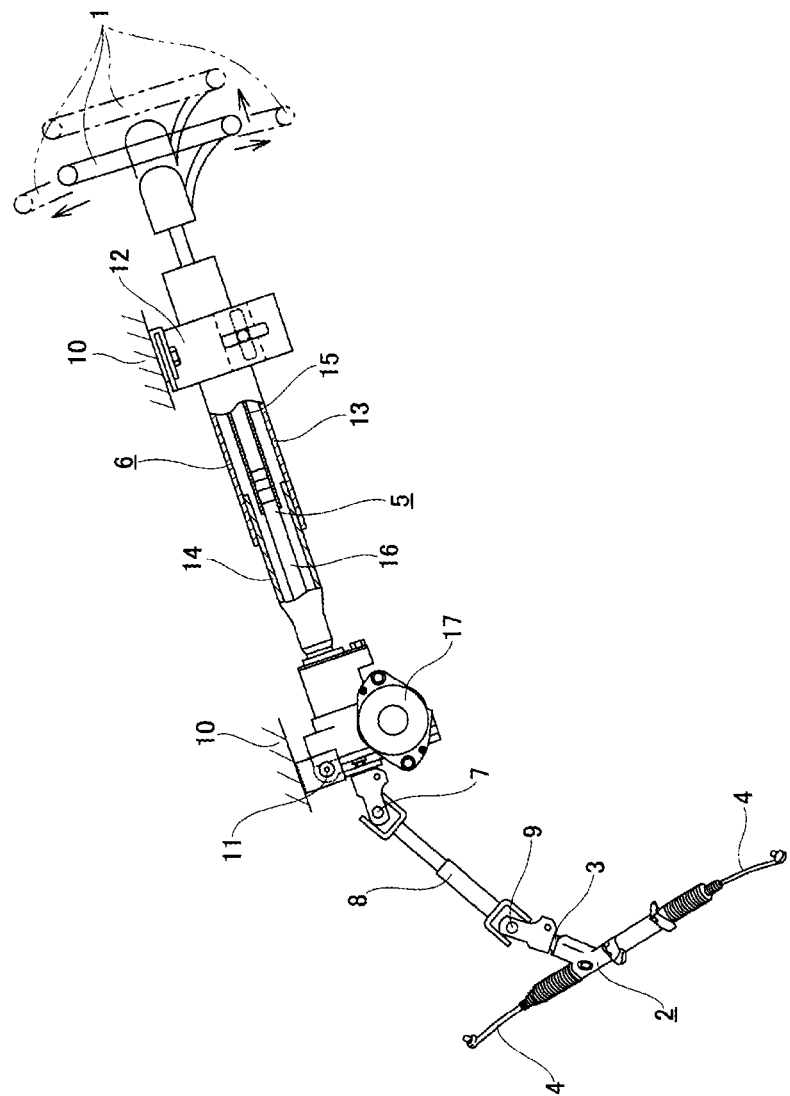
FIG. 12 is a partially-cut schematic side view of a conventionally known steering apparatus including a telescopic mechanism and a tilt mechanism.

However, the connecting method is not limited to this method, but there may also be adopted, for example, a method in which, as shown in FIGS. 10 and 11, the paired projecting portions 46, 46 are inserted or press-fitted into the paired through holes 45, 45 with no fastening margin, and crimping portions 47, 47 formed by plastically deforming tip end portions of the two projecting portions 46, 46 outwardly are engaged with opening peripheral edges of the two through holes 45, 45. Also, although not shown, as the connecting method, there may also be adopted a connecting method using connecting members such as pins, rivets and screws, or using connecting technique such as adhesion and welding.

The remaining structures and operation effects of this embodiment are similar to the above-mentioned first embodiment.

INDUSTRIAL APPLICABILITY

In the above-mentioned embodiments, description has been given of the position adjusting apparatus of the steering wheel including the telescopic mechanism for adjusting the front-rear position of the steering wheel and the tilt mechanism for adjusting the upper-lower position of the steering wheel. However, the present invention can also apply to a position adjusting apparatus of the steering wheel including only one of the telescopic mechanism and tilt mechanism.

Also, the drive cam is not limited to one which is made of a sintered metal or a ceramic. For example, the drive cam may also be made by subjecting a steel-made base member to plastic working such as forging or cutting.

The drive cam may also be made by cutting regardless of manufacturing methods so long as it is made of a ceramic.

Also, the driven cam may also be made of the same material as the drive cam, that is, a sintered metal or a ceramic material.

The base end portion of the adjusting lever is not limited to one which is made by subjecting a metal plate to plastic working such as bending. For example, the base end portion of the adjusting lever may also be made by casting a light alloy such as an aluminum alloy or by injection molding synthetic resin.

The connection of the adjusting lever and drive cam is not limited to the engagement between the lever side engagement portion and cam side engagement portion. For example, it may also be attained by proper techniques such as screwing, adhesion and welding.

This application is based on Japanese Patent Application No. 2014-063086 filed on Mar. 26, 2014 and Japanese Patent Application No. 2014-100834 filed on May 14, 2014, the contents of which are incorporated herein by reference.

DESCRIPTION OF REFERENCE NUMERALS

1: steering wheel
2: steering gear unit
3: input shaft

4: tie rod
5, 5a: steering shaft
6, 6a, 6b: steering column
7: universal joint
8: intermediate shaft
9: universal joint
10: vehicle body
11: pivot shaft
12, 12a: support bracket
13, 13a, 13b: outer column
14, 14a: inner column
15, 15a: outer shaft
16, 16a: inner shaft
17: electric motor
18, 18a, 18b: adjusting lever
19, 19a: adjusting rod
20, 20a: cam device
21: cam member
22, 22a: displacement bracket
23: support plate portion
24: upper-lower long hole (vehicle body side through hole)
25: front-rear long hole (column side through hole)
26, 26a, 26: drive cam
27, 27a: driven cam
28: projecting portion
29: recessed portion
30: step portion
31: male screw portion
32: nut
33, 33a: engagement projecting portion
34, 34a: engagement hole
35, 35a, 35b: center hole
36: sleeve
37: nut
38: engagement recessed portion
39: lever side through hole
40: head
41: axial slit
42: held portion
43: base end portion main body
44: base end portion sub-body
45: through hole
46: projecting portion
47: crimping portion

The invention claimed is:

1. A position adjusting apparatus of a steering wheel, the position adjusting apparatus comprising:
   a cylindrical steering column which rotatably supports therein a steering shaft, a rear end portion of which a steering wheel is supported and fixed to;
   a displacement bracket which is fixed to a portion of the steering column;
   a support bracket which is supported on a vehicle body and includes left and right support plate portions which interpose the displacement bracket from both sides in a width direction;
   an adjusting rod which is inserted in the width direction through vehicle body side through holes formed in the support plate portions and a column side through hole formed in the displacement bracket; and
   a cam device which includes a drive cam externally engaged with and supported on an axial one end portion of the adjusting rod such that an axial displacement is prevented, and a driven cam engaged into the vehicle body side through hole formed in one of the two support plate portions and externally engaged with and supported on a portion of the adjusting rod close to an axial end thereof such that an axial displacement is permitted, wherein the drive cam is rotatable based on an operation of an adjusting lever connected to the drive cam, and the cam device is configured to extend and contract an axial dimension of the cam device according to a rotation of the drive cam with respect to the driven cam, thereby extending and contracting a distance between the two support plate portions,
   wherein at least one of the vehicle body side through holes and the column side through hole is an adjusting long hole which is long in a direction in which a position of the steering wheel can be adjusted,
   wherein a base end portion of the adjusting lever includes a lever side through hole penetrating through the base end portion in the width direction,
   wherein the adjusting rod is press-fitted into the lever side through hole,
   wherein the adjusting lever includes a lever side engagement portion provided in an inside surface of the base end portion in the width direction,
   wherein the drive cam includes a cam side engagement portion provided in an outside surface of the drive cam in the width direction,
   wherein the lever side engagement portion and the cam side engagement portion are non-circularly engaged with each other with a fastening margin to be non-rotatable with each other, and
   wherein the lever side engagement portion and the lever side through hole are formed in the base end portion of the adjusting lever while being offset in the axial direction.

2. The position adjusting apparatus of the steering wheel according to claim 1, wherein the adjusting rod is inserted into a center hole of the drive cam with no fastening margin.

3. The position adjusting apparatus of the steering wheel according to claim 2, wherein the drive cam is made of a sintered metal or a ceramic.

4. The position adjusting apparatus of the steering wheel according to claim 1,
   wherein the base end potion of the adjusting lever is made of a material softer than a material which constitutes the adjusting rod.

5. The position adjusting apparatus of the steering wheel according to claim 1,
   wherein the base end portion of the adjusting lever is configured by combining together multiple parts, and
   wherein the lever side through hole and the lever side engagement portion are formed in mutually different ones of the multiple parts.

6. The position adjusting apparatus of the steering wheel according to claim 1,
   wherein the adjusting lever is made of a material softer than a material which constitutes the drive cam.

* * * * *